United States Patent [19]

Jaufmann et al.

[11] Patent Number: 4,738,387

[45] Date of Patent: Apr. 19, 1988

[54] FLEXIBLE MANUFACTURING SYSTEM FOR THE PROCESSING AND PRODUCTION OF MULTI-PART SUBASSEMBLIES, IN PARTICULAR SUBASSEMBLIES OF SEMI-FINISHED VEHICLE BODIES

[75] Inventors: Franz Jaufmann, Wehringen; Werner von Hacht, Uttenreuth, both of Fed. Rep. of Germany

[73] Assignees: Kuka Schweissanlagen + Robotor GmbH, Berlin; Siemens Aktiengesellschaft, Munich, both of Fed. Rep. of Germany

[21] Appl. No.: 900,148

[22] PCT Filed: Nov. 23, 1985

[86] PCT No.: PCT/EP85/00641

§ 371 Date: Jul. 23, 1986

§ 102(e) Date: Jul. 23, 1986

[87] PCT Pub. No.: WO86/03153

PCT Pub. Date: Jun. 5, 1986

[30] Foreign Application Priority Data

Nov. 26, 1984 [DE] Fed. Rep. of Germany ....... 3443076

[51] Int. Cl.[4] .............................................. B23K 37/00
[52] U.S. Cl. ....................................... 228/4.1; 228/47; 901/7; 29/563; 193/35 R; 193/35 SS
[58] Field of Search ...................... 228/47, 4.1; 901/7; 29/563; 193/35 SS, 35 R

[56] References Cited

U.S. PATENT DOCUMENTS

| | | |
|---|---|---|
| 2,613,798 | 10/1952 | McPhee . |
| 3,796,327 | 3/1974 | Meyer et al. .................... 214/38 BB |
| 4,256,947 | 3/1981 | De Candie ............................ 219/79 |
| 4,359,305 | 11/1982 | Young et al. ........................ 414/43 |
| 4,583,634 | 4/1986 | Kraus et al. ........................ 228/47 |
| 4,642,014 | 2/1987 | Saarinen .......................... 193/35 SS |

FOREIGN PATENT DOCUMENTS

| | | | |
|---|---|---|---|
| 2405024 | 8/1975 | Fed. Rep. of Germany | .......... 901/7 |
| 2810822 | 9/1978 | Fed. Rep. of Germany | ........ 228/47 |
| 3109219 | 7/1982 | Fed. Rep. of Germany | ... 193/35 SS |
| 3209222 | 9/1983 | Fed. Rep. of Germany | ........ 228/47 |
| 3345920 | 6/1985 | Fed. Rep. of Germany | .......... 901/7 |
| 772958 | 11/1980 | U.S.S.R. | .......................... 193/35 SS |
| 837691 | 6/1981 | U.S.S.R. | ................................ 228/47 |
| 846194 | 7/1981 | U.S.S.R. | ................................ 228/47 |

Primary Examiner—Nicholas P. Godici
Assistant Examiner—Samuel M. Heinrich
Attorney, Agent, or Firm—Karl F. Ross; Herbert Dubno

[57] ABSTRACT

The invention is concerned with the design of processing stations for the processing, by welding technology, of semi-finished vehicle body subassemblies (5) within the framework of a flexible manufacturing system. Thereby, frame-like work piece carriers (1) with support members (4) are used for loose positioning of components of the subassemblies (5), where the work piece carriers (1) are also capable of accepting differently configured subassemblies. The transfer line (9) is not planned as a single line, but includes only the input station (10), the work position (6) and the output station (11). Next to these stations (10, 11), storage stations (14) are arrayed, which are connected with one another by a transport system (20) which crosses the transfer line (9). In this manner it is made possible to store the work piece carriers (1) with the processed subassemblies (5) or to bypass the next work station if it is not capable of receiving (a work piece carrier), or is out of order. For this bypass path, transport vehicles (27) with their own transverse transporter (28) are utilized, which are capable of taking work piece carriers (1) from the storage stations (14) or of transferring (work piece carriers) to them.

9 Claims, 4 Drawing Sheets

FLEXIBLE MANUFACTURING SYSTEM FOR THE PROCESSING AND PRODUCTION OF MULTI-PART SUBASSEMBLIES, IN PARTICULAR SUBASSEMBLIES OF SEMI-FINISHED VEHICLE BODIES

CROSS REFERENCE TO RELATED APPLICATIONS

This application is a national phase application corresponding to PCT/AT85/00641 filed Nov. 23, 1985 and based, in turn, upon a German national application No. P 3443076.8 filed Nov. 26, 1984 under the International Convention.

FIELD OF THE INVENTION

The present invention relates to a flexible manufacturing system for the processing and production of multi-part subassemblies, in particular subassemblies of semi-finished vehicle bodies, in which a frame-shaped workpiece carrier with elements of subassemblies placed thereon, is fed to one or more work stations, which among themselves need not be arranged along an assembly line, where the individual work stations ahead of and after the work position, e.g. a welding station, have an input or an output station for the workpiece carrier, between which a linear transporter for the workpiece carriers operates.

BACKGROUND OF THE INVENTION

From U.S. Pat. No. 4,256,947 it is known that the customary assembly line, which is characterized by a straight-through transfer line, and can be broken up individual work stations arranged side by side. The workpiece elements to be connected and welded together are first retained by a workpiece carrier, which is guided into the input station of the pertinent work station along a prepared guide path by a suitable transport device. From there, the workpiece carrier arrives at a work position where, by means of industrial robots, welding in the sense of tacking or finish welding is carried out. By means of switches, the correlation of the guided work piece carrier with a given work position among several lying side by side can be controlled.

Although the above teaching permits the flexible completion of semi-finished vehicle bodies, the equipment required is considerable, the floor space requirements are extensive, and the transportation of the workpieces involves problems.

OBJECT OF THE INVENTION

It is the object of the invention to provide the individual work stations in such manner that the necessary operations can be carried out independently from the operational readiness of other work stations belonging to a common group. Furthermore it is an object to develop further the adaptability of the various work stations to different manufacturing steps in the presence of changing subassemblies.

SUMMARY OF THE INVENTION

With U.S. Pat. No. 4,256,947 as a starting point, the essence of the invention is that in addition to the input and output stations additional storage stations are provided which are connected with the input and output stations lying between them by a transport system for the workpiece carriers crossing the linear transporter.

In this manner, it is achieved, to start with, that the workpiece carriers need not be run into the input stations and out of the output stations along the transfer line. This shortens the working length of a given work station considerably. By placing the storage stations next to the input and output stations, a condition is created whereby the workpiece carrier can be fed and removed transversely to the transfer line and, in addition, can be stored. The invention permits the use of floorbound transport vehicles which, guided inductively, can be moved between the various work stations, storage stations etc.

Such transport vehicles are known for flexibly automated production layouts e.g. for the purpose of transporting metallic pallets with workpieces fastened thereon between pallet change stations of machine tools (VDI Journal 121; 1979; p. 83–95). This concerns comparatively small workpieces, which does not immediately suggest the manufacture of semi-finished vehicle bodies in similar manner.

A considerable increase of the flexibility of the manufacturing system according to the invention is attained when the workpiece carrier has a spacing and centering means by which the workpiece carriers with their subassembly components can be stacked. For this purpose it is advisable to provide in the corners of the work piece carriers vertical locating pins and mating centering bores, the lengths of the locating pins being a measure for the spacing of the work piece carriers in the stack, because the invention wants to make it possible to stack the work piece carriers with the subassemblies contained thereon.

This basic concept leads, in the sense of the invention, to at least the input station, preferably also the output station, being equipped with a lifting arrangement for the raising of a work piece carrier present in the station; the support member of the lifting arrangement can be positioned below the workpiece carrier and movable out of the path of the workpiece carrier.

By means of this concept it is possible to utilize the period during which a subassembly is being processed to lift the workpiece carrier present in the input or output station, thus forming a stack, and to permit the insertion of another workpiece carrier below the stack. Furthermore, it is possible by means of the arrangement described above to transfer such a stack from the input or output station sideways into the storage station. By means of the transport vehicle mentioned above, such stack of work piece carriers can be taken up and brought into the area of a different work station. This is particularly advantageous when the work station actually intended for the next operation has a breakdown, or is otherwise not ready to receive a workpiece carrier. Thus, this work station can be bypassed, and the available capacity of other work stations can be utilized.

The formation of stacks also has the purpose of forming a buffer for a certain number of workpiece carriers, which insures continuation of production even when the flow of workpiece carriers from one work station to the next is temporarily interrupted.

A special advantage will arise when in the sense of the invention several work stations are arranged in series, but offset sideways so that the storage station arranged on the output side comes to lie next to the input station of the subsequent work station, and is connected therewith by a transverse transporter.

In this manner, several work stations can be fixedly interconnected, without one station being dependent on the others, because by associating storage stations with input and output stations there is always the possibility of bypassing work stations which are out of order, by taking transferring stacks the above-mentioned transport carriage and feeding them to another work station ready to accept them.

This arrangement also makes it possible to guide tooling units, equipped for two or more different product models, in the space below the linear transporter, from park position into working position. One can thus feed several models selectively into the same work station. Means are provided by suitable controls that the tooling unit for a given model is transferred from the park position into the operating position. Additional space requirements are not connected therewith, since the park positions can come come to lie beneath the input and output stations of the work station.

BRIEF DESCRIPTION OF THE DRAWING

Details of the invention become evident from the drawing. In it, the invention is represented diagrammatically. In the drawing.

Figure 1:
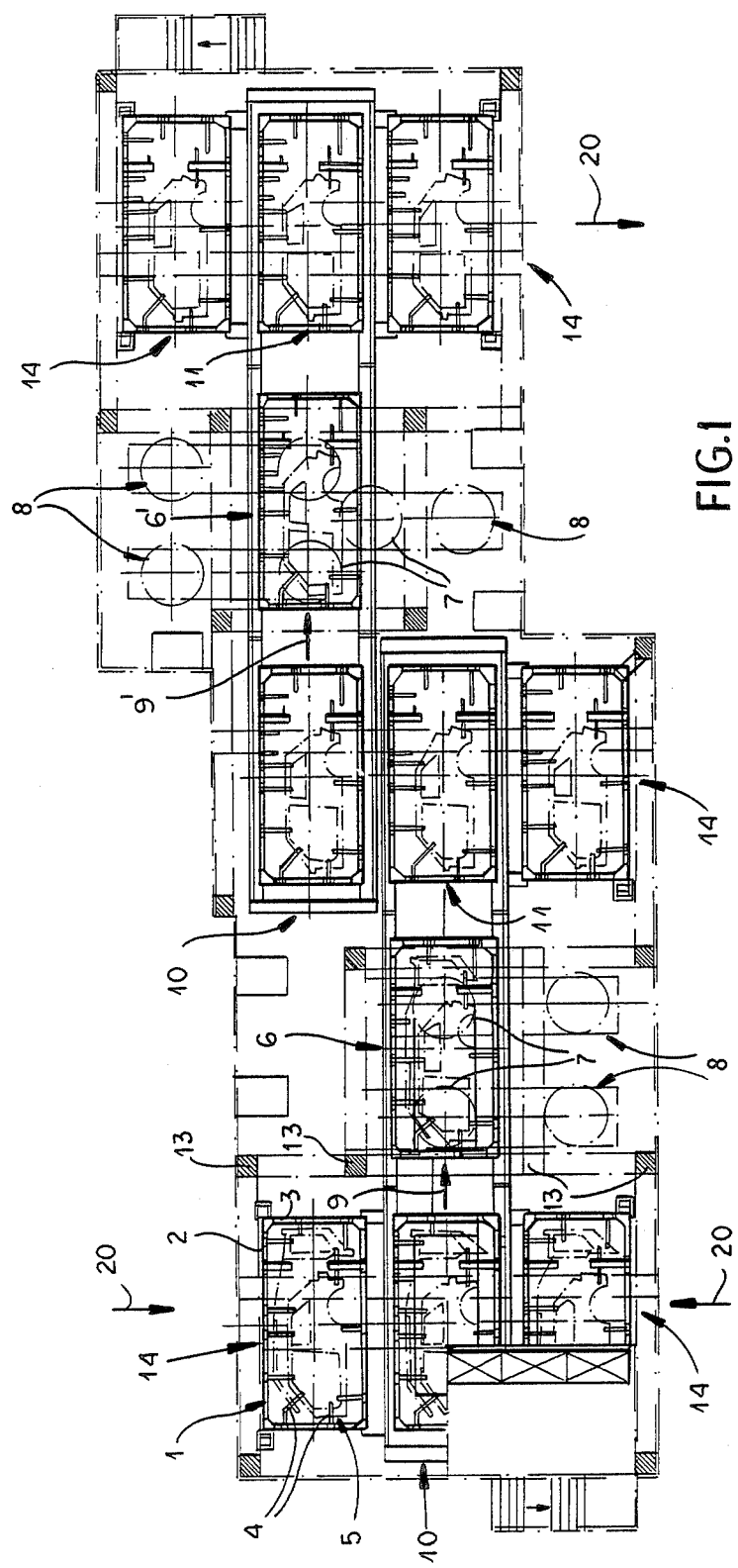
FIG. 1 is a plan view of two work stations related to one another.
Figure 2:
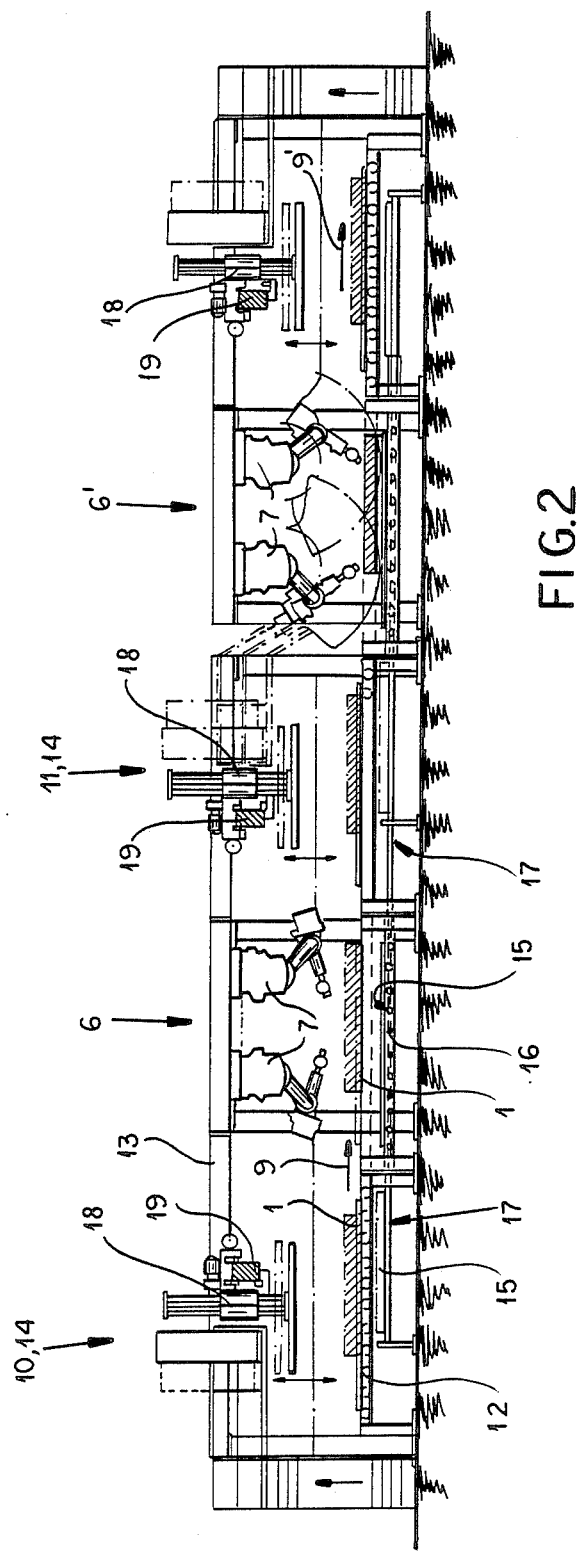
FIG. 2 is a side view of the arrangement according to FIG. 1.

In the embodiment 1 of FIGS. 1 and 2, two work stations related to one another are shown, which can best be recognized by the transfer lines 9 and 9' laterally displaced from one another. In the center of each transfer line 9, 9' there is a work position 6 and 6', which in the illustrated embodiment is filled with industrial robots 7. It is assumed, as FIG. 2 shows, that these robots 7 are suspended, and can act upon the work piece from above.

In the transfer line 9, 9', ahead of each work position 6 or 6' there is a respective input station 10 for work piece carrier 1. On the exit side of work positions 6, 6' output stations 11 are provided in the transfer line 9, 9'.

As opposed to the state of the art, the work piece carrier 1 is not guided into and away from the work stations along the transfer lines 9, 9'. Rather, as FIG. 1 shows, there are so-called storage stations 14 next to the input and output stations 10, 11, into which the work piece carriers 1 are introduced in the direction of the arrows 20 in a suitable manner. These arrows 20 symbolize a transport system crossing the transfer line 9 or 9' which is equipped to move the work piece carriers 1 from the storage station 14 to the input or output station 10, 11, or to execute this movement in the opposite direction.

The individual work piece carrier 1 comprises a frame. It has two longitudinal members 2 parallel to one another, which are connected by transverse members 3. From these members 2, 3, several support members 14 protrude into the free interior of the work piece carrier. They are intended to receive loosely individual parts of the subassemblies 5. FIG. 1 shows the processing of a side wall subassembly for a passenger car, the procedure being that these parts of subassembly 5 are brought into correct working positions either mechanically or manually no later than in operating position 6, and that they are fixed there by means of spot-welds. In working position 6' the final welding of the parts tacked to one another can occur.

Figure 4:
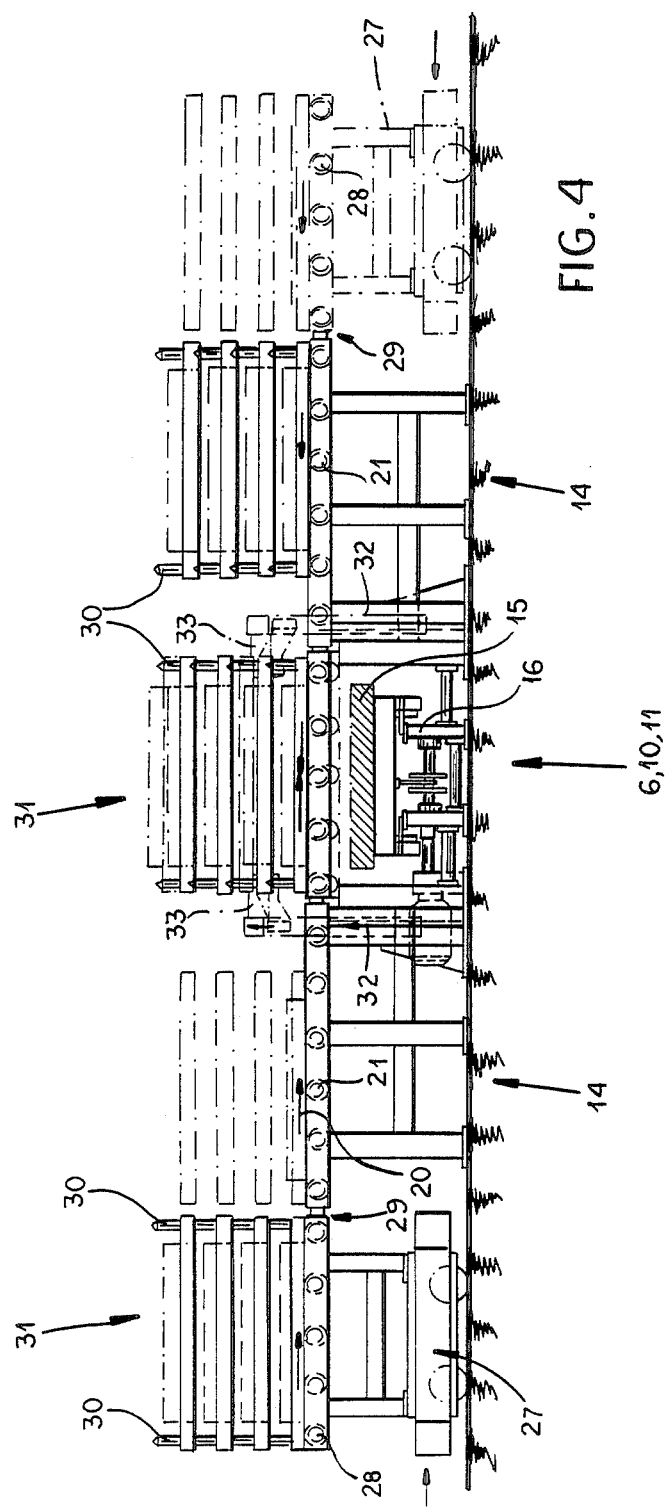
FIG. 4 is a front view of the arrangement of FIG. 3.

The moving of the work piece carrier 1 towards one of the frontward storage stations 14 can be achieved e.g. by means of a self-propelled transport vehicle, which may be guided inductively or by rails, or may even be steerable. In any case, this transport vehicle which is shown in FIG. 4 as 27 in one embodiment must be capable of bringing the work piece carrier, which in the confines of a magazine has been equipped with subassembly 5, by means of the crossing transport system 20, first into the storage station 14 from the side, and then into input station 10. For this purpose, as FIG. 2 shows, a transfer mechanism 18 can be used. The transfer mechanism 18 is movable along a beam 19 transverse to transfer line 9, and is in position to produce a vertical lift. This transfer can, for example, move the work piece carrier 1 from a transport carriage into storage station 14 and from there into input station 10. But it is also conceivable that a work piece carrier 1 is already present in the storage station 14 and is there being loaded with a subassembly, which is carried there by means of the transfer 18.

As soon as work piece carrier 1 with subassembly 5 is fed transversely into input station 10, work piece carrier 1 is introduced into work position 6 by means of the linear transporter 12, which is shown schematically in FIG. 2. There a tooling unit 15 is placed into working position. This embodiment is based on the premise that this tooling unit 15 is capable of being moved to and fro below the linear transporter 12 by means of its own transporter 16, and may contain several tooling subgroups each of which can be associated with a certain type of subassembly. As FIG. 2 shows, the tooling unit 15 can be transported from the position of the input station 10 all the way to the position of output station 11, so that it is possible to selectively move one of the tooling units 15 into the working position 6, and another tooling unit 15 into the park position 17.

In FIG. 2 it is further implied that the work piece carrier 1 in work position 6 has been lowered. This can be accomplished e.g. by implementing a portion of the linear transporter 12 or 16 in a liftable or lowerable manner.

The robots 7 being in working positions 6 or 6' can be moved transverse to transfer line 9, 9' along the guides provided on structure 13, which has a service position 8 for robot 7. In this service position 8 a magazine for various tools may also be present, the robot being capable of changing its tools automatically as required.

The work piece carrier 1 outfitted with the subassembly 5 being worked on moves from work position 6 into output position 11, where further paths of the work piece carrier 1 can be branched off selectively. If the subsequent work station with the work position 6' is ready to receive, (then) the work piece carrier is transferred out of the output station 11 by means of a crossing transport system 18, 20 into input station 10 of the subsequent work station, and there transferred along transfer line 9' into work position 6'.

If however the processing station of work position 6' is not capable of receiving work, which may be due e.g. to differing processing times, breakdown or the like, then it should not be necessary to shut down work position 6. In this case, in fact, the work piece carrier positioned in output station 11 is transferred into storage station 14 by means of the crossing transportation system 18, 20, where it will then be decided whether workpiece carrier 1 remains stored there or is taken up by a transport vehicle 27 according to FIG. 4. By this acceptance of the work piece carrier 1 there arises in fact the possibility to bypass the workstation not capable or receiving or work or which has broken down, and to send the work piece carrier with the subassembly 5 to a different work station still capable of accepting work.

The flexible manufacturing system according to the invention is based on the premise that by means of suitable controls and due to the capability of robots to execute a tool change automatically, it is comparatively simple to reach a buffer station which is then capable of carrying out the most variegated operations when in the normal flow of the work piece carriers 1 a breakdown occurs. In this manner, the work stations not broken down can continue to operate without interference, which effect a considerable inclrease in performance.

It goes without saying that the output staion 11 arrayed after work position 6' can again be provided with a storage station 14 arrayed to one side. The addition of further work stations is possible; the step-like offset of the transfer lines 9, 9' is not absolutely necessary, provided that next to an output station 11 a storage station 14 is arranged, which permits the lateral withdrawal of the work piece carrier 1.

Figure 3:
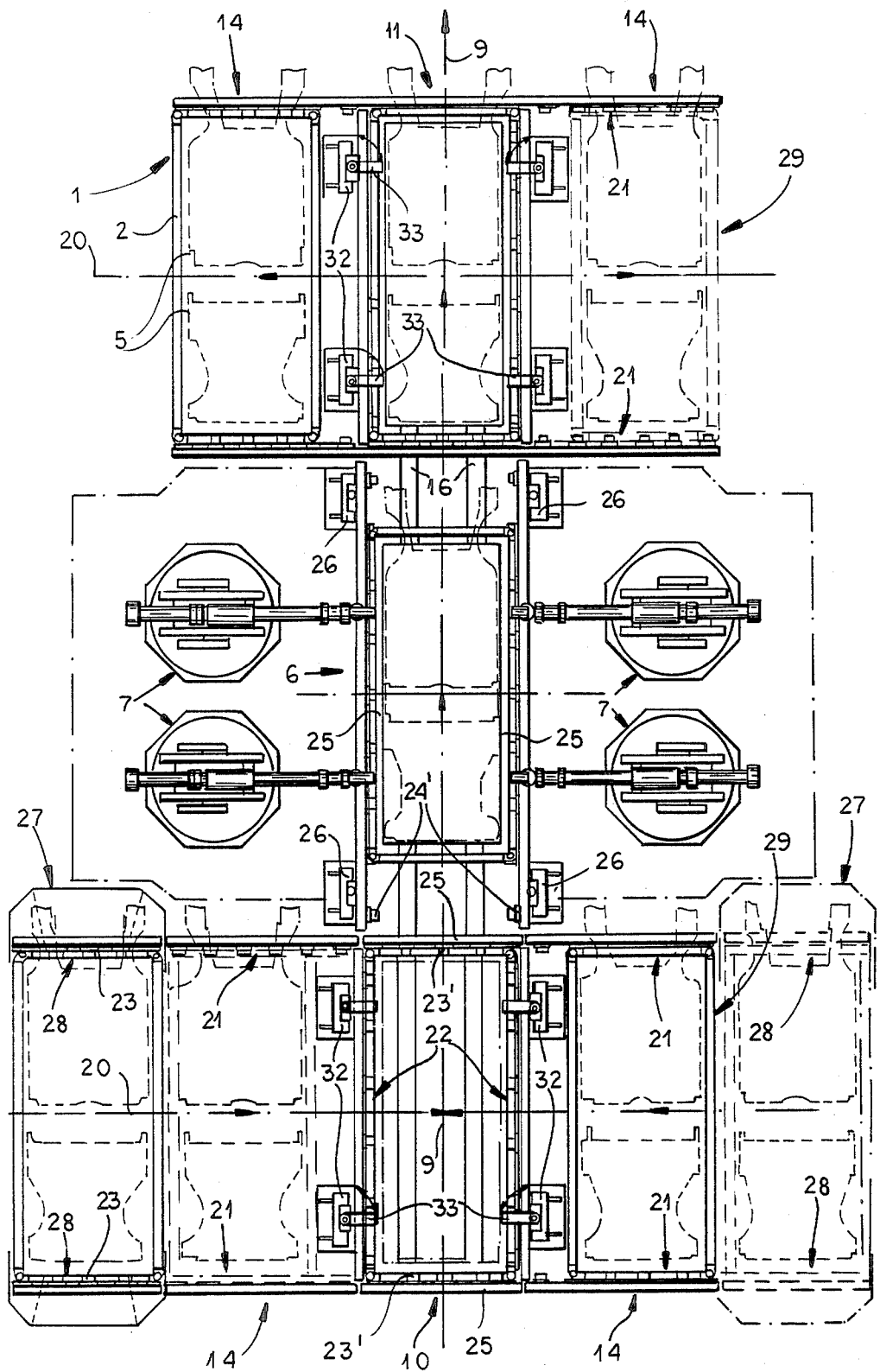
FIG. 3 is a plan view of a work station with crossing roller conveyors.

The embodiment of FIGS. 3 and 4 represent a further simplification and design conformation different from the above-described embodiment of FIGS. 1 and 2. The crossing transport system 20 is here made up of roller conveyor 21, which has a multiplicty of guide rollers 23, 23' journalled in an overhung manner, which are supported on structure 13 of the arrangement. The distance between opposing guide rollers 23 corresponds exactly to the distance between transverse members 13 so that it is assured that work piece carrier 1 with its transverse members 3 is guidedly movable on this roller conveyor 21.

As FIGS. 3 and 4 show furthermore, the transport vehicle 27 exhibits the same type roller conveyor 28, which provides the possibility of transferring the work piece carrier 1 positioned on the transport vehicle 27 beyond the transfer position 29 into the storage station 14.

The roller conveyor 22, which connects the input station 10 with the output station 11 along transfer line 9 is also equipped with cantilevered guide rollers 24, whose spacing corresponds to the distance between longitudinal members 3 of the work piece carriers.

Naturally, care must be taken hereby that the work piece carrier 1 during transition from roller conveyor 21 onto roller conveyor 22 must not be obstructed in its motion. For this reason, the guide rollers 23' of the roller conveyor 21 are placed on rails 25 which are adjustable in elevation by means of lifting devices. One can thus lower the guide rollers 23' of input station 10 in order to deliver the work piece carrier 1 to the guide rollers 24 of roller conveyor 22 which are in a somewhat lower position. When the work piece carrier 1 has reached its normal position in the input station 10, then the carriers 25 with the guide rollers 23' are lowered further so as to be able to introduce the work piece carrier 1 from the input station 10 into the work position 6 by means of the roller conveyor 22.

As FIG. 4 shows, the tooling unit 15 is emplaced below the roller conveyors 21, 22. Thereby, tooling unit 15 is placed into the position of being moved selectively from the working position 6 into the position below the input station 10 or the output station 11, which in turn makes possible the use of specialized tools suited to various models being processed.

This requires, however, that the work piece carrier 1 ought to be made lowerable in working position 6, in order that the tools of tooling unit 15 can work upon and reach under the subassembly 5 placed upon work piece carrier 1. This lowering motion can also be carried out by the by means of lifting devices 26 in the area of working position 6, which act upon rails 25 in which the height-adjustable guide rollers 24 are fastened.

As FIG. 4 shows, the work piece carriers 1 are stackable. This is accomplished by providing in the corner areas of the work piece carriers 1, spacing and locating means 30 are provided, for example in form of vertical locating pins, which extend upwards from the work piece carrier 1. Consequently, on the underside a locating bore is provided at corresponding locations into which the pins extend. The length of the pins is a measure for the permissible height of subassembly 5, since it goes without saying that the workpiece carriers 1 must be stackable with their subassemblies (workpieces) thereon.

In the embodiment of FIGS. 3 and 4, the formation of stacks is accomplished in the areas of the input station 10 and/or the output station 11. For this purpose, lifting devices 32 are provided with their swingable arms 33. These arms 33 are intended to grasp the longitudinal members 2 of the work piece carriers 1 from below. A work piece carrier 1, in place for example in normal position in the output station 11, will thus be lifted via the lifting device 32, 33, in order that a different work piece carrier 1 can be transferred from work station 6 into the output station 11 along the roller conveyor 22. The work station shown in FIG. 3 is thus in a position to process a multiplicity of subassemblies 5, without the necessity that the work piece carriers 1 associated with these subassemblies 5 be transported into the next work station. Rather, there exists the possibility of transferring a stack 31 of several work piece carriers 1 sideways out of the output station 11 into storage station 14 by means of the roller conveyor 21, from where the stack 31 is taken over by a transport vehicle 27 and fed to other work stations or magazines in the manner described above.

The stack 31 can also remain temporarily in the storage station 14, in fact until the out-of-order situation in the subsequent work station is eliminated. Thereafter, one can guide stack 31 out of storage station 14 back into output station 11 and from there, in accordance with FIG. 1, into the input station of the work station next in sequence.

It can be seen that the assignment of the individual stations shown in the various examples of FIGS. 1 and 3 form the basis for working flexibly in a manner manageable within existing control technology.

We claim:

1. An apparatus for the processing of multipart subassemblies constituting workpieces, said apparatus comprising:

a first work station provided with robot tools for working on said subassemblies to effect at least partial processing thereof to a semifinished product;

respective workpiece carriers movable into and out of said first work station and formed with respective frames upon which said subassemblies are mounted;

first linear guide means extending through said first work station for advancing said carriers into and out of said first work station;

an input station along said linear guide means immediately ahead of said first work station for receiving said carriers to be advanced into said first work station;

an output station along said linear guide means immediately downstream of said first work station for receiving said carriers from said first work station;

a second work station provided with robot tools for working on said subassemblies to effect at least a further processing thereof to a product and provided with a second linear guide means extending through said second work station for advancing said carriers into said second work station from an input station upstream of said second work station along said second linear guide means and out of said second work station to a respective output station downstream of said second work station along said second linear guide means;

respective transverse guide means at least for said input and output stations along said first linear guide means, each of said transverse guide means extending perpendicular to and intersecting said first linear guide means for shifting said carriers transversely into and out of said input and output stations along said first linear guide means; and respective storage stations positioned laterally of said input and output stations along said first linear guide means connected therewith by the respective transverse guide means for receiving said carriers with the respective subassemblies thereon for temporary storage and return to said input and output stations along said first linear guide means and processing in a workstation downstream thereof.

2. The apparatus defined in claim 1 wherein said workpiece carriers are formed with spacing and locating means enabling said carriers with the respective subassemblies thereon to be stacked.

3. The apparatus defined in claim 1 wherein at least one of the input and output stations laterally of which a respective said storage station is provided, is formed with a lifting device having arms engageable from below with the frame of a carrier to be stacked and swingable out of the path of a carrier shiftable along the respective guide means.

4. The apparatus defined in claim 1 wherein each of said guide means comprises a roller conveyor having a multiplicity of cantilevered rollers supporting opposite members of said frames of said carriers.

5. The apparatus defined in claim 4 wherein the rollers of the roller conveyors define guide planes of different heights and have intersections at which the rollers of one of the intersecting conveyors are vertically adjustable to the level of the other intersecting conveyor.

6. The apparatus defined in claim 5 wherein the vertically adjustable rollers are fastened to rails extending parallel to a direction of transport on the respective conveyor, and said rails are connected to lifting devices.

7. The apparatus defined in claim 1 wherein said carriers are displaced on powered transport vehicles and said transverse guide means includes transverse transporters on said vehicles for transferring said carriers to and from said storage stations.

8. The apparatus defined in claim 1 wherein said second linear guide means is transversely offset from said first linear guide means so that said output station of said first linear guide means lies laterally adjacent said input station of said second linear guide means and is connected therewith by one of said transverse guide means.

9. The apparatus defined in claim 1 wherein each of said work stations is provided below a respective carrier positioned at the said work station with a path for a tooling unit shiftable from an operative position into a park position laterally of the respective work station.

* * * * *